United States Patent
Martin et al.

(10) Patent No.: US 9,570,217 B2
(45) Date of Patent: Feb. 14, 2017

(54) PROCESS FOR PREPARING A MAGNETIC TALCOUS COMPOSITION, AND MAGNETIC TALCOUS COMPOSITION

(71) Applicants: CENTRE NATIONAL DE LA RECHERCHE SCIENTIFIQUE (C.N.R.S.), Paris (FR); UNIVERSITÉ PAUL SABATIER TOULOUSE III, Toulouse (FR)

(72) Inventors: Francois Martin, Sainte Foy d' Aigrefeuille (FR); Pierre Micoud, Peyssies (FR); Angela Dumas, Pechabou (FR); Christophe Le Roux, Avignonet Lauragais (FR); Emmanuel Gardes, Caen (FR)

(73) Assignees: CENTRE NATIONAL DE LA RECHERCHE SCIENTIFIQUE (C.N.R.S.), Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 199 days.

(21) Appl. No.: 14/367,690

(22) PCT Filed: Dec. 21, 2012

(86) PCT No.: PCT/FR2012/053060
§ 371 (c)(1),
(2) Date: Sep. 22, 2014

(87) PCT Pub. No.: WO2013/093376
PCT Pub. Date: Jun. 27, 2013

(65) Prior Publication Data
US 2015/0008356 A1 Jan. 8, 2015

(30) Foreign Application Priority Data
Dec. 22, 2011 (FR) .................... 11 04029

(51) Int. Cl.
*C01B 33/20* (2006.01)
*C01B 33/22* (2006.01)
*C09C 1/28* (2006.01)
*H01F 1/01* (2006.01)
*C01G 49/08* (2006.01)

(52) U.S. Cl.
CPC ............. *H01F 1/01* (2013.01); *C01B 33/20* (2013.01); *C01B 33/22* (2013.01); *C01G 49/08* (2013.01); *C09C 1/28* (2013.01); *C01P 2006/42* (2013.01); *Y10T 428/2982* (2015.01)

(58) Field of Classification Search
CPC ............................ C09C 1/3054; C09C 1/3045
See application file for complete search history.

(56) References Cited

FOREIGN PATENT DOCUMENTS

| JP | 08-60032 | * | 3/1996 |
|---|---|---|---|
| JP | 2004-130296 A | | 4/2004 |
| WO | 2007/087172 | | 8/2007 |
| WO | 2008/009799 | | 1/2008 |

OTHER PUBLICATIONS

International Search Report dated Apr. 23, 2013, in corresponding PCT application.
Database CA [Online] Chemical Abstracts Service, Columbus, Ohio, US; Sep. 19, 1986 (Sep. 19, 1986), Ono, Hideo: "Magnetic powder", XP002680273. retrieved from STN Database accession No. 105:107131 abstract & JP 61 091907 A (Taiho Industries Co., Ltd., Japan) May 10, 1986 (May 10, 1986).
Database WPI Week 200864 Thomson Scientific, London, GB; AN 2008-K75543 XP002680258. & JP 2008 143720 A (Adchemco Corp) Jun. 26, 2008 (Jun. 26, 2008) abstract.
Sanchez R. et al: "Study of Fe(II) oxidation in ground magnetite". Materials Research Bulletin. Elsevier, Kidlington, GB, vol. 25, No. 5, May 1, 1990 (May 1, 1990). pp. 553-561. XP025463284. ISSN: 0025-5408. DOI: 10.1016/0025-5408(90)90020-3 [retrieved on May 1, 1990] the whole document.
Yang et al. "Magnetic and structural studies of the Verwey transition in Fe3—(delta)O4 nanoparticles" Journal of Applied Physics, (Jun. 1, 2004); 95 (11); 7540.

* cited by examiner

*Primary Examiner* — Carol M Koslow
(74) *Attorney, Agent, or Firm* — Young & Thompson

(57) ABSTRACT

A process for preparing a magnetic talcous composition including mineral particles, referred to as magnetic talcous particles, having a non-zero magnetic susceptibility, in which, during an oxidative contacting step, talcous particles chosen from the group formed from 2:1 lamellar silicates having a zero electric charge are brought into contact with particles including at least one magnetic iron oxide chosen from the group formed from magnetite and maghemite, the magnetic particles having a mean equivalent diameter of between 1 nm and 50 nm. A magnetic talcous composition including mineral particles, referred to as magnetic talcous particles, having a non-zero magnetic susceptibility, at least 20% by weight of talcous particles and at least 0.5% by weight of magnetic particles is also described.

16 Claims, No Drawings

PROCESS FOR PREPARING A MAGNETIC TALCOUS COMPOSITION, AND MAGNETIC TALCOUS COMPOSITION

The invention relates to a process for preparing a composition comprising magnetic mineral particles, and to a composition comprising such magnetic mineral particles.

Throughout the text, "mineral particle" denotes any inorganic particle which contains carbon, where applicable, only in the form of carbonate or cyanide.

Throughout the text, "2:1 sheet silicate" or "T.O.T.-type sheet silicate" denotes any sheet silicate (or phyllosilicate) in which each elementary lamina is constituted by the association of two layers of inverted tetrahedrons situated on either side of a layer of octahedrons, each layer of octahedrons being formed by octahedrons of type $YO_6$ (Y denoting a cation) which are connected together, and each layer of tetrahedrons being constituted by a continuous two-dimensional layer of tetrahedrons of type $SiO_4$, in which each tetrahedron is connected to its neighbors by sharing three of its vertices. In view of their structure, 2:1 phyllosilicates are also described as being of the T.O.T. (that is to say tetrahedron-octahedron-tetrahedron) type.

In other words, in a 2:1 sheet silicate, two-dimensional networks of tetrahedrons are arranged on either side of a median layer of octahedrons, each layer of octahedrons being formed of two planes of $O^{2-}$ and $OH^-$ ions (in the molar proportion $O^{2-}/OH^-$ of 2/1) and each layer of tetrahedrons being formed of tetrahedrons each having one vertex occupied by an oxygen of an octahedral layer and three vertices occupied by substantially coplanar oxygens. Furthermore, the shared oxygens of the tetrahedrons are said to form a basal plane of oxygens of hexagonal or ditrigonal symmetry.

The phyllosilicates are composed of a regular or irregular stack of elementary laminae of crystalline structure, the number of which varies from a few units to several thousand units.

The group of the 2:1 sheet silicates having a zero electric charge is composed especially of talc, willemseite and pyrophyllite. Therefore, in the following text, "talcous particle" or "talcous composition" denotes any particle or any composition comprising particles belonging to the group of the 2:1 sheet silicates having a zero charge.

Throughout the text, "hydrothermal treatment" denotes any treatment carried out in a closed vessel, such as an autoclave, in the presence of water at a predetermined temperature and at a pressure greater than atmospheric pressure.

The 2:1 sheet silicates such as talc of the formula $Si_4Mg_3O_{10}(OH)_2$ are used in various industrial fields, such as the field of polymers, paper, paints and varnishes, textiles, metallurgy, pharmaceuticals, cosmetics, or phytosanitary products, in which the phyllosilicates are used, by incorporation into a composition, as an inert filler (for their chemical stability or also to dilute active ingredients of higher cost) or as functional fillers (for example in order to enhance the mechanical properties of certain materials).

WO 2008/009799 proposes a process for preparing a talcous composition comprising at least one synthetic mineral containing silicon and/or germanium and metal of type $Si_4Mg_3O_{10}(OH)_2$ by hydrothermal treatment of a hydrogel containing silicon and/or germanium and metal, in the liquid state, at a temperature of from 300° C. to 600° C. Such a talcous composition according to WO 2008/009799 comprises particles containing silicon, germanium and metal which have structural similarities with natural talc.

However, it might be of interest to have available mineral particles belonging to the group of the sheet silicates which have magnetic properties, such as ferromagnetic or ferrimagnetic and in particular ferrimagnetic properties.

Therefore, the invention aims to propose a process for preparing a composition which comprises silicate mineral particles having magnetic properties.

The invention aims to propose a process for preparing a composition which comprises synthetic silicate mineral particles having magnetic properties.

The invention aims to propose such a process which is simple and quick to carry out and is compatible with the constraints of industrial exploitation.

The invention also aims to propose a composition which comprises silicate mineral particles having magnetic properties.

The invention aims to propose compositions which comprise phyllosilicate mineral particles having magnetic properties and which can be used as a replacement for natural talc compositions in various applications.

To that end, the invention relates to a process for preparing a composition, called a magnetic talcous composition, which comprises mineral particles, called magnetic talcous particles, which have a non-zero magnetic susceptibility, wherein, during a contacting step:

talcous particles chosen from the group formed of 2:1 sheet silicates having a zero electric charge and a mean equivalent diameter of from 10 nm to 300 nm are contacted with particles, called magnetic particles, comprising at least one magnetic iron oxide chosen from the group formed of magnetite and maghemite, said magnetic particles having a mean equivalent diameter of from 1 nm to 50 nm.

The inventors have found, surprisingly, that a process according to the invention in which such nanometric talcous particles and such nanometric magnetic particles are used makes it possible to prepare mineral particles which have, especially at ambient temperature (for example from 18° C. to 25° C.), magnetic properties which are different from those of known 2:1 sheet silicates of zero charge.

Surprisingly, the simple contacting of talcous particles having a mean equivalent diameter of from 10 nm to 300 nm and magnetic particles (comprising magnetite and/or maghemite) having a mean equivalent diameter of from 1 nm to 50 nm makes it possible to obtain a magnetic talcous composition in which the magnetic particles and the talcous particles are durably linked together, without its being necessary to carry out major technical measures such as prolonged heat treatment at high temperature or prolonged grinding with high shear.

A possible explanation for the affinity between the magnetic particles and the talcous particles would be linked to a correspondence between the size of the magnetic particles and the size of the talcous particles and in particular the thickness (or the edge size) of the talcous particles, the inventors having observed that the magnetic particles preferably attach themselves along the edges of the talc laminae, for example, and in particular with the formation of O—H bonds.

Said contacting step (or oxidative contacting step) between the talcous composition and said magnetite particles can be carried out in any manner that makes it possible to obtain a magnetic talcous composition comprising magnetic silicate particles having a non-zero magnetic susceptibility.

The talcous particles and the magnetic particles can especially be contacted with one another in the dry state or in solution, for example in aqueous solution. In the case of a preparation in solution, the magnetic particles can be prepared prior to being contacted with the talcous particles and can then be contacted in solution with the talcous particles, or they can be prepared "in situ" from at least one precursor element of said magnetic particles, that is to say in a solution comprising the talcous particles.

According to a first variant embodiment of a process according to the invention, the contacting of the talcous particles and the magnetic particles is carried out in a liquid medium.

Advantageously and according to the invention, during the contacting step:
an aqueous solution is prepared,
talcous particles and magnetic particles are added to the aqueous solution, and
the aqueous solution is removed.

Furthermore, advantageously and according to the invention, after having added the talcous particles and the magnetic particles to the aqueous solution, said solution containing the talcous particles and the magnetic particles is mixed. The aqueous solution is then removed by drying.

Advantageously and according to the invention, after having carried out contacting in solution of the talcous particles and the magnetic particles, the talcous particles and the magnetic particles are dried, the magnetic particles being in contact with the talcous particles. In particular, advantageously and according to the invention, during the contacting step, the talcous particles and the magnetite particles are dried, the magnetite particles and the talcous particles thus being in contact in a dry state. The inventors have found, surprisingly, that such a step of contacting by simultaneous drying of the talcous particles and of the magnetite particles makes it possible to obtain magnetic talcous particles comprising at least 20 wt. % to 99.5 wt. % talcous particles and at least 0.5 wt. % to 80 wt. % magnetite and/or maghemite particles, the ratio by mass between the magnetic particles and the talcous particles being from 0.005 to 4.

In a preferred embodiment of a process according to the invention, during the contacting step:
at least one precursor element of said magnetic particles is introduced into an aqueous suspension comprising talcous particles,
a precipitation reaction of said magnetic particles is carried out.

In particular, in a preferred embodiment of a process according to the invention:
at least one precursor element of said magnetite particles is introduced into an aqueous suspension comprising the talcous particles,
a precipitation reaction, called an in situ precipitation reaction, of said magnetite particles is carried out, and
the talcous particles and the magnetite particles obtained are dried together.

As precursor elements of magnetite $Fe_3O_4$ particles there can be used, for example, iron(III) chloride hexahydrate ($FeCl_3 \cdot 6H_2O$) and iron(II) chloride tetrahydrate ($FeCl_2 \cdot 4H_2O$), and the precipitation reaction of the magnetite $Fe_3O_4$ particles can be carried out by adding a predetermined amount of an aqueous ammonia solution.

According to a second variant embodiment of a process according to the invention, contacting of the talcous particles and the magnetic particles is carried out in the dry state.

Advantageously and according to the invention, during the oxidative contacting step, co-grinding, in particular co-grinding in the dry state, of the talcous particles and of the magnetic particles is carried out. The inventors have found, surprisingly, that such a contacting step (or oxidative contacting step) by simultaneously grinding the talcous particles and the magnetic particles, especially magnetite and/or maghemite particles, makes it possible to obtain magnetic talcous particles, especially magnetic talcous particles comprising at least 20 wt. % talcous particles and at least 0.5 wt. % magnetite and/or maghemite particles. In particular, simple mechanical treatment or gentle grinding, that is to say grinding that does not require high shear forces, is sufficient to create strong and durable interactions between talcous particles having a mean equivalent diameter of from 10 nm to 1000 nm, especially from 10 nm to 300 nm, and magnetic particles having a mean equivalent diameter of from 1 nm to 50 nm.

Advantageously and according to the invention, said magnetic talcous particles have a positive magnetic susceptibility. Furthermore, advantageously and according to the invention, said magnetic talcous particles have a magnetic susceptibility greater than 1, in particular greater than $10^3$.

Advantageously and according to the invention, said 2:1 sheet silicates having a zero electric charge are devoid of interfoliar cations and interfoliar water molecules. Because the sheet silicates have a zero electric charge, they do not have interfoliar cations, also called charge compensating cations, or interfoliar water molecules which are often associated with said charge compensating cations in the interfoliar space of silicates having a positive non-zero charge.

Advantageously and according to the invention, the talcous particles have the chemical formula $(Si_xGe_{1-x})_4M_3O_{10}(OH)_2$ wherein:
x is a number in the range of 0 to 1, and
M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a number in the range of 0 to 1, and such that $$\sum_{i=1}^{8} y(i) = 1.$$

Advantageously and according to tne invention, the group formed of the 2:1 sheet silicates having a zero charge comprises especially talc, willemseite, pyrophyllite and mixtures thereof. Advantageously and according to the invention, the talcous particles are formed of talc $Si_4Mg_3O_{10}(OH)_2$.

Advantageously and according to the invention, the magnetic particles, especially the magnetite particles, have a mean equivalent diameter of from 1 nm to 50 nm, especially from 1 nm to 30 nm, in particular from 1 nm to 15 nm, and more particularly from 5 nm to 10 nm.

The talcous particles chosen from the group formed of the 2:1 sheet silicates having a zero charge that are used in a process according to the invention can be of natural or synthetic origin. Advantageously and according to the invention, the talcous particles chosen from the group formed of the 2:1 sheet silicates having a zero charge are synthetic.

Advantageously and according to the invention, the talcous particles have a mean equivalent diameter of from 10 nm to 1000 nm, in particular from 10 nm to 300 nm, and more particularly from 20 nm to 200 nm.

Throughout the text, the "thickness" of the talcous particles denotes the smallest dimension of said particles, that is to say the dimension of said particles in the c direction of the crystal lattice of said talcous particles.

Throughout the text, the "largest dimension" of the talcous particles denotes the largest dimension of said particles in the (a, b) plane of the crystal lattice of said talcous particles.

The thickness and the largest dimension of the talcous particles are measured by observation by scanning electron microscopy (SEM) or by transmission electron microscopy (TEM).

Advantageously and according to the invention, said talcous particles have a diameter of from 1 nm to 30 nm, in particular from 5 nm to 20 nm, for example of approximately 10 nm. Advantageously and according to the invention, the largest dimension of the talcous particles is from 10 nm to 400 nm, in particular from 20 nm to 300 nm, and more particularly from 20 nm to 200 nm.

Any type of talcous particles can be used in a process according to the invention. Advantageously and according to the invention, the talcous particles can be prepared by hydrothermal treatment of a hydrogel precursor of said mineral particles which is a silico/germano-metallic gel (i.e. containing silicon, germanium and metal) $(Si_xGe_{1-x})_4 M_3O_{11}, n'H_2O$, M denoting at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a number in the range of 0 to 1, and such that $$\sum_{i=1}^{8} y(i) = 1,$$

and x being a number in the range of 0 to 1, n' relating to a number of water molecules associated with said silico/germano-metallic gel.

The hydrothermal treatment of the silico/germano-metallic gel can be carried out in an aqueous medium, optionally in the presence of at least one carboxylate salt which allows the hydrothermal treatment to be improved, especially which allows its duration to be shortened. Advantageously and according to the invention, the hydrothermal treatment of the silico/germano-metallic gel is carried out in the presence of at least one carboxylate salt of the formula $R_2$—COOM', M' denoting a metal chosen from the group formed of Na and K, and $R_2$ being chosen from H and alkyl groups containing fewer than 5 carbon atoms.

Advantageously and according to the invention, during the contacting step, the talcous particles are contacted with the magnetic particles, for example the magnetite and/or maghemite particles, in such a manner that the ratio by mass between the magnetic particles and the talcous particles is from 0.005 to 4. In that manner it is possible to prepare magnetic talcous particles having a non-zero magnetic susceptibility comprising from 20 wt. % to 99.5 wt. % talcous particles and from 0.5 wt. % to 80 wt. % magnetic iron oxide particles, that is to say magnetite particles and also, or not, maghemite particles.

The invention extends to a composition, called a magnetic talcous composition, comprising mineral particles, called magnetic talcous particles, having a non-zero magnetic susceptibility, said magnetic talcous particles comprising at least 20 wt. % to 99.5 wt. % talcous particles chosen from the group formed of 2:1 sheet silicates having a zero electric charge and at least 0.5 wt. % to 80 wt. % maghemite particles relative to the total weight of said magnetic talcous composition, the ratio by mass between the magnetic particles and the talcous particles being from 0.005 to 4.

The invention extends also to a composition, called a magnetic talcous composition, comprising mineral particles, called magnetic talcous particles, having a non-zero magnetic susceptibility, said magnetic talcous particles comprising:

at least 20 wt. % to 99.5 wt. % talcous particles relative to the total weight of said magnetic talcous composition, said talcous particles being chosen from the group formed of the 2:1 sheet silicates having a zero electric charge and a mean equivalent diameter of from 10 nm to 300 nm, and at least 0.5 wt. % to 80 wt. % particles, called magnetic particles, comprising at least one magnetic iron oxide chosen from the group formed of magnetite and maghemite, relative to the total weight of said magnetic talcous composition, said magnetic particles having a mean equivalent diameter of from 1 nm to 50 nm.

The ratio by mass between the magnetic particles and the talcous particles is from 0.005 to 4.

Accordingly, a composition according to the invention comprises talcous particles and magnetic particles, such as magnetite and/or maghemite particles, which are linked together at least partially to form a magnetic talcous composition comprising magnetic talcous particles, having a non-zero magnetic susceptibility.

It is possible to check the presence of magnetite or maghemite in the magnetic talcous particles so formed by X-ray diffraction or by IR or Raman spectroscopy (magnetite especially having characteristic bands between 570 and 590 $cm^{-1}$ and maghemite also having characteristic bands at about 730 $cm^{-1}$, 695 $cm^{-1}$, 630 $cm^{-1}$, 590 $cm^{-1}$, 560 $cm^{-1}$, 480 $cm^{-1}$ and 440 $cm^{-1}$). Furthermore, it is possible to check the presence of magnetite and/or maghemite in the magnetic talcous particles and the proportion of magnetite and the proportion of maghemite by Mossbauer spectroscopy or by the technique called "SQUID".

Advantageously and according to the invention, said magnetic talcous particles have a positive magnetic susceptibility.

Advantageously and according to the invention, a magnetic talcous composition according to the invention is prepared by a process according to the invention.

In particular, advantageously and according to the invention, a magnetic talcous composition according to the invention has ferrimagnetic properties. Advantageously and according to the invention, such a composition comprises magnetic talcous particles having ferrimagnetic properties.

The invention relates also to a process for preparing a magnetic talcous composition and to a magnetic talcous composition, characterized in combination by all or some of the features mentioned hereinabove or hereinbelow.

Other objects, advantages and features of the invention will become apparent upon reading the description and the examples which follow.

In a first embodiment of a process according to the invention, the talcous particles are prepared by hydrothermal treatment of a hydrogel precursor of said talcous particles, in particular of a silico/germano-metallic gel.

1.—Preparation of a Silico/Germano-Metallic Gel

Accordingly, in a first variant embodiment of the first embodiment of a process according to the invention, the silico/germano-metallic gel is prepared by coprecipitation according to the following reaction equation:

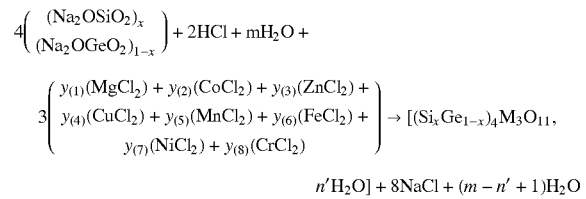

$$n'H_2O] + 8NaCl + (m - n' + 1)H_2O$$

m, n' and (m−n'+1) being positive integers,

M denoting at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a number in the range of 0 to 1, and such that

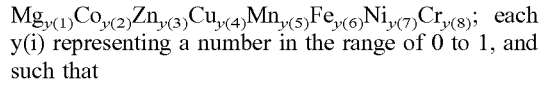

x being a number in the range of 0 to 1, n' relating to a number of water molecules associated with said silico/germano-metallic gel.

This coprecipitation reaction makes it possible to obtain a hydrated silico/germano-metallic gel having the stoichiometry of talc (4 Si/Ge for 3 M). It is carried out starting from:

1. an aqueous solution of sodium metasilicate pentahydrate or an aqueous solution of sodium metagermanate hydrate, or a mixture of these two solutions in the molar proportions x:(1−x), 2. a solution of metal chloride, prepared with one or more metal salts (in hydrated or non-hydrated form) diluted in distilled water, and 3. a 1N hydrochloric acid solution.

The silico/germano-metallic gel is prepared in accordance with the following protocol:

1. the hydrochloric acid solution and the metal chloride solution are mixed, 2. the mixture is added to the sodium metasilicate and/or metagermanate solution; the coprecipitation gel forms instantly, 3. the gel is recovered after centrifugation (from 3000 to 7000 revolutions/minute, for from 5 to 20 minutes, for example 3500 revolutions per minute for 15 minutes) and removal of the supernatant (sodium chloride solution that forms), 4. the gel is washed with water, in particular with distilled or osmozed water, at least two washing/centrifugation cycles being carried out, 5. the gel is recovered after centrifugation.

At the end of this first phase, a hydrated silico/germano-metallic gel $(Si_xGe_{1-x})_4M_3O_{11}$, n'H$_2$O of gelatinous consistency is obtained. The gel exhibits thixotropic behaviour, that is to say it changes from a viscous state to a liquid state when stirred and then returns to its initial state if it is left to rest for a sufficient period of time.

In a second variant embodiment of the first embodiment of a process according to the invention, the gel containing silicon, germanium and metal is prepared by a coprecipitation reaction involving, as reagent, at least one compound comprising silicon, at least one dicarboxylate salt of the formula $M(R_1—COO)_2$ in the presence of at least one carboxylate salt of the formula $R_2—COOM'$, M' denoting a metal chosen from the group formed of Na and K, and $R_1$ and $R_2$ each being chosen from H and alkyl groups containing fewer than 5 carbon atoms.

This coprecipitation reaction makes it possible to obtain a hydrated silico/germano-metallic gel which has the stoichiometry of talc (4 Si for 3 M, M having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a number in the range of 0 to 1, and such that)

$$\sum_{i=1}^{8} y(i) = 1$$

The silico/germano-metallic gel is prepared by a coprecipitation reaction, which is carried out starting from:

1. an aqueous solution of sodium metasilicate pentahydrate or an aqueous solution of sodium metagermanate hydrate, or a mixture of those two solutions in the molar proportions x:(1−x), 2. a solution of dicarboxylate salt(s) prepared with one or more dicarboxylate salt(s) of the formula $M(R1-COO)_2$ diluted in a carboxylic acid, such as acetic acid, and 3. a solution of carboxylate salt(s) prepared with one or more carboxylate salt(s) of the formula R2-COOM' diluted in distilled water.

The hydrogel precursor is prepared in accordance with the following protocol:

1. the solutions of sodium metasilicate and carboxylate salt(s) of the formula $R_2—COOM'$ are mixed, 2. the solution of dicarboxylate salt(s) of the formula $M(R_1—COO)_2$ is added rapidly thereto; the coprecipitation hydrogel forms instantly.

It is further possible to subject the preparation medium of said hydrogel to ultrasound.

At the end of this precipitation there is obtained a silico/germano-metallic gel $(Si_xGe_{1-x})_4M_3O_{11}$, n'H$_2$O in an aqueous solution of carboxylate salt(s), said hydrogel being strongly hydrated and having a more or less gelatinous consistency.

The silico/germano-metallic gel $(Si_xGe_{1-x})_4M_3O_{11}$, n'H$_2$O obtained, in the presence of the carboxylate salt(s) of the formulae $R_2—COOM'$ and $R_1—COOM'$, is accordingly ready to be subjected directly to a hydrothermal treatment.

The hydrogel can also be recovered after centrifugation (for example from 3000 to 15,000 revolutions per minute for from 5 to 60 minutes) and removal of the supernatant (solution of carboxylate salt(s)), optionally washing with demineralized water (for example two successive washings and centrifugations) and then drying, for example in an oven (60° C., 2 days), by lyophilization, by drying by atomization or alternatively by drying under microwave irradiation. The particles containing silicon and/or germanium and metal of the formula $(Si_xGe_{1-x})_4M_3O_{11}$, n'H$_2$O can accordingly be stored in the form of a powder (in the presence or absence of the carboxylate salts(s), depending on whether washing with water has been carried out or not) with a view to a subsequent hydrothermal treatment.

2.—Hydrothermal Treatment of the Silico/Germano-Metallic Gel

The silico/germano-metallic gel as obtained hereinbefore is subjected to a hydrothermal treatment at a temperature of from 100° C. to 400° C. for a period of from 30 minutes to 60 days, especially from 1 hour to 10 days, in particular from 1 hour to 10 hours. The silico/germano-metallic gel obtained by precipitation can likewise first be dried in an oven at 60° C., for example for two days, before being subjected to a hydrothermal treatment.

In order to carry out the hydrothermal treatment:
1. the gel, in liquefied form, is placed in a reactor,
2. there is optionally added to said gel, with stirring, a solution comprising at least one carboxylate salt of the formula $R_2$—COOM', M' denoting a metal chosen from the group formed of Na and K, and $R_2$ being chosen from H and alkyl groups containing fewer than 5 carbon atoms (in hydrated or anhydrous form),
3. the liquid/solid ratio is optionally adjusted to value of from 2 to 20, especially from 5 to 15 (the quantity of liquid being expressed in cm$^3$ and the quantity of solid in grams),
4. the reactor/autoclave is placed inside an oven at a predetermined reaction temperature (established at from 100° C. to 400° C.) for the whole of the duration of the treatment.

In the first variant embodiment of a process according to the invention, at the end of this hydrothermal treatment there is obtained a colloidal talcous composition comprising talcous particles belonging to the group of the 2:1 sheet silicates of zero charge in solution in water. The talcous particles can be recovered by centrifugation and removal of the supernatant.

In the second variant embodiment of a process according to the invention, at the end of this hydrothermal treatment there are obtained talcous particles in suspension in an aqueous solution of carboxylate salt(s). At the end of this hydrothermal treatment, the talcous particles contained in the reactor are recovered by centrifugation (from 3000 to 15,000 revolutions per minute for from 5 to 60 minutes) and then removal of the supernatant. The composition comprising talcous particles that is recovered is then, preferably, washed with water, in particular with distilled or osmozed water, at least two washing/centrifugation cycles being carried out.

In each of the two variant embodiments of a process according to the invention described above, the composition comprising talcous particles that is recovered after the last centrifugation can then be dried:
in an oven at a temperature of from 60° C. to 130° C. for from 1 to 24 hours, or
by lyophilization, for example in a lyophilizer of the CHRIST ALPHA® 1-2 LD Plus type, for from 48 hours to 72 hours,
or by atomization.

At the end of such a hydrothermal treatment there is obtained, after drying, a solid divided composition comprising particles of the formula $(Si_xGe_{1-x})_4M_3O_{10}(OH)_2$, in particular particles of talc of the formula $Si_4Mg_3O_{10}(OH)_2$.

3.—Contacting for the Preparation of a Magnetic Talcous Composition

A talcous composition comprising talcous particles as obtained hereinbefore is contacted with magnetite particles under conditions suitable for oxidizing said magnetite particles at least partially to maghemite.

The magnetite nanoparticles formed by synthesis can be non-stoichiometric (oxygen and/or cation gap stoichiometry). The chemical formula of a magnetite is written $(Fe^{3+})_A[Fe^{2+}+Fe^{3+}]_B 4O^{2-}$. The oxidation of the $Fe^{2+}$ to $Fe^{3+}$ (on the B site) is accompanied by the formation of gaps and gives the following general formula: $(Fe^{3+})_A[Fe^{2+}_{1-3\delta}+Fe^{3+}_{1+2\delta\delta}]_B O_4$. This oxidation can in some cases lead to the formation of maghemite (total absence of $Fe^{2+}$).

Verification of this non-stoichiometry is made by X-ray diffraction. According to the curve of Yang et al. ("Magnetic and structural studies of the Verwey transition in $Fe_{3-\delta}O_4$ nanoparticles" Journal de Physique Appliquée, Volume 95, number 11, 1 Jun. 2004), which gives the variation of the lattice parameter as a function of the deviation from the stoichiometry δ in magnetite $Fe_{3-\delta}O_4$. It is possible, for example, to use magnetite particles of the following formula: $Fe_{2.72\pm0.01}O_4$ or $Fe_{2.86\pm0.01}O_4$. This deviation in stoichiometry is attributed to oxidation at the surface of the $Fe^{2+}$ ions.

The talcous particles and the magnetite particles can be contacted in the dry state or in solution. In the case of such a preparation in solution, the magnetite particles can be prepared prior to contacting with the talcous particles and then contacted in solution with the talcous particles, or they can be prepared "in situ" starting from at least one precursor element of said magnetite particles, that is to say in a solution comprising the talcous particles.

In the case of contacting of the talcous particles and of the magnetite particles in solution, the suspension obtained is then centrifuged in order to separate the magnetic talcous particles from the supernatant solution.

The magnetic talcous composition that is recovered can further optionally be washed with water, in particular with distilled or osmozed water, one or more washing/centrifugation cycle(s) being carried out.

The magnetic talcous composition that is recovered after the last centrifugation can then be dried, especially in an oven, by lyophilization or alternatively by atomization.

There is thus obtained a magnetic talcous composition comprising particles of the formula $(Si_xGe_{1-x})O_4M_3O_{10}(OH)_2$, in particular particles of talc $Si_4M_3O_{10}(OH)_2$, associated with maghemite particles (and optionally with magnetite particles).

EXAMPLE 1

A silico/germano-metallic gel of the formula $Si_4Mg_3O_{11}$, n'H$_2$O is prepared and subjected to a hydrothermal treatment for 6 hours at a temperature of 300° C. Synthetic talc is thus obtained.

On the one hand, a synthetic talc suspension is prepared by mixing, with magnetic stirring, 20 g of an aqueous suspension (in the form of a gel) comprising talc particles, the moisture content of which is 90% (that is to say 10 wt. % talc, relative to the total weight of said suspension), in 70 ml of distilled water. The talc particles have a mean equivalent diameter of from 20 nm to 100 nm, and in particular a thickness of approximately from 10 nm to 20 nm and a largest dimension (or particle length) of approximately 200 nm.

On the other hand, an aqueous solution of iron chlorides is prepared by dissolving, with magnetic stirring, 10.81 g of iron(III) chloride hexahydrate (FeCl$_3$.6H$_2$O) and 3.98 g of iron(II) chloride tetrahydrate (FeCl$_2$.4H$_2$O) in 200 ml of distilled water. The solution is then made up with distilled water to 250 ml.

54 ml of the aqueous solution of iron chlorides are added, with magnetic stirring, to the synthetic talc suspension, that is to say the equivalent of 50 wt. % magnetite Fe$_3$O$_4$ relative to the talc. The solution obtained has a yellow coloration.

From 3 to 5 ml of ammonia in 30% aqueous solution are then added, with magnetic stirring. Magnetite particles then form by precipitation, and the suspension assumes a black coloration. The magnetic particles have a mean equivalent diameter of from 5 nm to 30 nm.

After 5 to 10 minutes of magnetic stirring, the suspension obtained is centrifuged in order to separate the particles comprising talc and magnetite $Fe_3O_4$ from a supernatant solution of ammonium chloride. The particles so obtained are dried by lyophilization.

After drying there is obtained a magnetic talcous composition which comprises magnetic talcous particles comprising 66.6 wt. % talc and 33.4 wt. % magnetic iron oxide particles (that is to say magnetite $Fe_3O_4$ particles and more than 0.5 wt. % maghemite γ-$Fe_2O_3$ particles) relative to the total weight of the magnetic talcous composition.

When a few grams of this composition comprising magnetic talcous particles are placed in a closed container made of transparent plastic and a magnet is brought up to the bottom of the container and the container is turned upside down, it is observed that the magnetic talcous particles do not fall but remain attracted by the magnet.

Furthermore, the composition comprising magnetic mineral particles that is obtained has a dark-brown coloration.

EXAMPLE 2

A silico/germano-metallic gel of the formula $Si_4Mg_3O_{11}$, n'$H_2O$ is prepared and is subjected to a hydrothermal treatment for 6 hours at a temperature of 300° C. Synthetic talc is thus obtained.

On the one hand, a synthetic talc suspension is prepared by mixing, with magnetic stirring, 10 g of an aqueous suspension (in the form of a gel) comprising talc particles, the moisture content of which is 90% (that is to say 10 wt. % dry talc relative to the total weight of said suspension), in 70 ml of distilled water. The talc particles have a mean equivalent diameter of from 20 nm to 100 nm, and in particular a thickness of approximately from 10 nm to 20 nm and a largest dimension (or particle length) of approximately 200 nm.

On the other hand, an aqueous solution of iron chlorides is prepared by dissolving, with magnetic stirring, 5.36 g of iron(III) chloride hexahydrate ($FeCl_3.6H_2O$) and 1.98 g of iron(II) chloride tetrahydrate ($FeCl_2.4H_2O$) in 100 ml of distilled water. The aqueous solution of iron chlorides is heated to 85° C. while being stirred magnetically and while nitrogen is bubbled through.

12 ml of ammonia in 30% aqueous solution are then added, with magnetic stirring. Magnetite particles then form by precipitation, and the suspension assumes a black coloration.

After 5 to 10 minutes of magnetic stirring, the suspension of magnetic iron oxide obtained is centrifuged in order to separate the magnetite $Fe_3O_4$ and maghemite γ-$Fe_2O_3$ particles from a supernatant solution containing ammonium chloride and excess ammonia. The magnetic iron oxide composition that is recovered is washed once with distilled water and then centrifuged again. Each centrifugation is carried out at 10,000 revolutions/minute for 40 minutes. A magnetic iron oxide composition is obtained, to which there are added 400 ml of distilled water and which is subjected to ultrasound for 1 hour. The magnetic particles have a mean equivalent diameter of from 5 nm to 30 nm.

34.48 ml of the aqueous solution of magnetic iron oxide that has been prepared are added to the synthetic talc suspension, that is to say the equivalent of 20 wt. % magnetic iron oxide relative to the talc. The suspension obtained is stirred magnetically for 10 minutes at ambient temperature (25° C.).

After drying there is obtained a magnetic talcous composition in suspension which comprises magnetic talcous particles having a positive magnetic susceptibility and comprising 83.4 wt. % talc and 16.6 wt. % magnetic iron oxide particles (that is to say magnetite $Fe_3O_4$ particles and more than 0.5 wt. % maghemite γ-$Fe_2O_3$ particles) relative to the total weight of the magnetic talcous composition.

EXAMPLE 3

A silico-metallic gel of the formula $Si_4Mg_3O_{ii}$, n'$H_2O$ is prepared and subjected to a hydrothermal treatment for 6 hours at a temperature of 300° C. Synthetic talc is thus obtained.

On the one hand there is prepared a synthetic talc composition composed of 1 g of talc obtained by drying an aqueous suspension recovered after hydrothermal treatment. The talc particles have a mean equivalent diameter of from 20 nm to 100 nm, and in particular a thickness of approximately from 10 nm to 20 nm and a largest dimension (or particle length) of approximately 200 nm.

On the other hand, an aqueous solution of iron chlorides is prepared by dissolving, with magnetic stirring, 5.36 g of iron(III) chloride hexahydrate ($FeCl_3.6H_2O$) and 1.98 g of iron(II) chloride tetrahydrate ($FeCl_2.4H_2O$) in 100 ml of distilled water. The aqueous solution of iron chlorides is heated to 85° C. while being stirred magnetically and while nitrogen is bubbled through.

12 ml of ammonia in 30% aqueous solution are then added, with magnetic stirring. Magnetite particles then form by precipitation, and the suspension assumes a black coloration. The magnetic particles have a mean equivalent diameter of from 5 nm to 30 nm.

After 5 to 10 minutes of magnetic stirring, the magnetic iron oxide suspension obtained is centrifuged in order to separate the magnetite $Fe_3O_4$ and maghemite γ-$Fe_2O_3$ particles from a supernatant solution containing ammonium chloride and excess ammonia. The magnetic iron oxide particles recovered are washed once with distilled water and then centrifuged again. Each centrifugation is carried out at 10,000 revolutions/minute for 40 minutes. The magnetic iron oxide particles recovered are then dried.

0.2 g of magnetic iron oxide particles is then mixed with the talc composition for 2 minutes in an agate mortar. The equivalent of 20 wt. % of magnetic iron oxide relative to the talc is thus contacted.

There is obtained a composition which comprises magnetic talcous particles having a positive magnetic susceptibility and comprising 83.4 wt. % talc and 16.6 wt. % magnetic iron oxide particles (that is to say magnetite $Fe_3O_4$ particles and more than 0.5 wt. % maghemite γ-$Fe_2O_3$ particles) relative to the total weight of the magnetic talcous composition.

The invention claimed is:

1. A process for preparing a composition, called a magnetic talcous composition, comprising mineral particles, called magnetic talcous particles, having a non-zero magnetic susceptibility, wherein, during a contacting step:
  talcous particles chosen from the group formed of the 2:1 sheet silicates having a zero electric charge and a mean equivalent diameter of from 10 nm to 300 nm are contacted with
  particles, called magnetic particles, comprising at least one magnetic iron oxide chosen from the group formed of magnetite and maghemite, said magnetic particles having a mean equivalent diameter of from 1 nm to 50 nm.

2. The process as claimed in claim 1, wherein the talcous particles and the magnetic particles are contacted in a liquid medium.

3. The process as claimed in claim 1, wherein, during the contacting step:
an aqueous solution is prepared,
talcous particles and magnetic particles are added to the aqueous solution, and
the aqueous solution is removed.

4. The process as claimed in claim 1, wherein, during the contacting step:
at least one precursor element of said magnetic particles is introduced into an aqueous suspension comprising talcous particles,
a precipitation reaction of said magnetic particles is carried out.

5. The process as claimed in claim 2, wherein, after contacting the talcous particles and the magnetic particles in a liquid medium the talcous particles and the magnetic particles are dried, the magnetic particles and the talcous particles being in contact in a dry state.

6. The process as claimed in claim 1, wherein, during the contacting step, co-grinding of the talcous particles and of the magnetic particles in the dry state is carried out.

7. The process as claimed in claim 1, wherein the 2:1 sheet silicates having a zero electric charge are devoid of interfoliar cations and of interfoliar water molecules.

8. The process as claimed in claim 1, wherein the talcous particles have the chemical formula $(Si_xGe_{1-x})_4M_3O_{10}(OH)_2$ wherein:
x is a number in the range of 0 to 1, and
M denotes at least one divalent metal having the formula $Mg_{y(1)}CO_{y(2)}Zn_{y(3)}Cu_{y(4)}Mn_{y(5)}Fe_{y(6)}Ni_{y(7)}Cr_{y(8)}$; each y(i) representing a number in the range of 0 to 1, and such that $$\sum_{i=1}^{8} y(i) = 1.$$

9. The process as claimed in claim 1, wherein the talcous particles are formed of talc $Si_4Mg_3O_{10}(OH)_2$.

10. The process as claimed in claim 1, wherein said magnetic particles have a mean equivalent diameter of from 1 nm to 30 nm.

11. The process as claimed in claim 1, wherein said talcous particles have a mean equivalent diameter of from 10 nm to 200 nm.

12. The process as claimed in claim 1, wherein, during the contacting step, the talcous particles are contacted with the magnetic particles in such a manner that the ratio by mass between the magnetic particles and the talcous particles is from 0.005 to 4.

13. A composition, called a magnetic talcous composition, comprising mineral particles, called magnetic talcous particles, having a non-zero magnetic susceptibility, said magnetic talcous particles comprising:
from 20 wt % to 99.5 wt % talcous particles relative to the total weight of said magnetic talcous composition, said talcous particles being chosen from the group formed of the 2:1 sheet silicates having a zero electric charge and a mean equivalent diameter of from 10 nm to 300 nm, and
from 0.5 wt % to 80 wt % magnetic particles, comprising at least one magnetic iron oxide chosen from the group formed of magnetite and maghemite, relative to the total weight of said magnetic talcous composition, said magnetic particles having a mean equivalent diameter of from 1 nm to 50 nm,
The ratio by mass between the magnetic particles and the talcous particles being from 0.005 to 4.

14. The composition as claimed in claim 13, wherein said magnetic talcous particles have a positive magnetic susceptibility.

15. The composition as claimed in claim 13, wherein it comprises at least 0.5 wt. % maghemite particles.

16. The composition as claimed in claim 14, wherein it comprises at least 0.5 wt. % maghemite particles.

* * * * *